United States Patent
Ziems et al.

(10) Patent No.: US 12,510,385 B2
(45) Date of Patent: Dec. 30, 2025

(54) EXPLOSION-PROTECTED HOUSING FOR MEANS FOR TRANSMITTING AND RECEIVING ELECTROMAGNETIC RADIATION

(71) Applicant: Minimax GmbH, Bad Oldesloe (DE)

(72) Inventors: Bernd Ziems, Zarpen (DE); Hauke Dittmer, Fehmarn (DE); Dirk Siemer, Rethwisch (DE); Axel Grothoff, Neumünster (DE); Peter Zülzer, Hamburg (DE); Arne Stamer, Siebenbäumen (DE); Pawel Wisniewski, Bad Oldesloe (DE); Timo Ziegenbein, Mollhagen (DE)

(73) Assignee: Minimax GmbH, Bad Oldesloe (DE)

( * ) Notice: Subject to any disclaimer, the term of this patent is extended or adjusted under 35 U.S.C. 154(b) by 278 days.

(21) Appl. No.: 18/482,365

(22) Filed: Oct. 6, 2023

(65) Prior Publication Data

US 2024/0077341 A1   Mar. 7, 2024

Related U.S. Application Data

(63) Continuation of application No. 15/778,947, filed as application No. PCT/EP2016/078827 on Nov. 25, 2016, now Pat. No. 11,821,757.

(30) Foreign Application Priority Data

Nov. 25, 2015   (DE) .................. 10 2015 223 362.6

(51) Int. Cl.
  *G01D 11/24*   (2006.01)
  *G01D 11/26*   (2006.01)
  (Continued)

(52) U.S. Cl.
  CPC ........... *G01D 11/26* (2013.01); *G01D 11/245* (2013.01); *G01J 5/0014* (2013.01); *G01J 5/041* (2013.01); *G01J 5/0875* (2013.01)

(58) Field of Classification Search
  CPC ....... G01D 11/245; G01D 11/26; G01J 5/041; G01J 5/0014; G01J 5/0875
  See application file for complete search history.

(56) References Cited

U.S. PATENT DOCUMENTS

| 2,358,613 A | 9/1944 | Angst |
| 3,347,008 A | 10/1967 | Strengholt |
| (Continued) | | |

FOREIGN PATENT DOCUMENTS

| CN | 2127533 Y | 2/1993 |
| CN | 1480016 A | 3/2004 |
| (Continued) | | |

OTHER PUBLICATIONS

International Searching Authority, International Search Report in German & English translation in International Appln. No. PCT/EP2016/078827, Feb. 16, 2017, 7 pages.

(Continued)

*Primary Examiner* — Jamel E Williams
(74) *Attorney, Agent, or Firm* — Perkins Coie LLP

(57) ABSTRACT

The invention relates to an explosion-protected housing for means for transmitting and/or receiving electromagnetic radiation. The housing comprises a housing body that is configured to receive such transmission and/or reception means and a window element having a first side that faces the housing interior and an opposite second side that faces away from the housing interior, wherein the window element transmits electromagnetic radiation. The housing body has a flanging on the second side of the window element, said flanging pressing the window element in the direction (Continued)

of a seat that is formed in the interior of the housing such that the housing is formed as a pressure-resistant housing and/or as a dust-tight housing.

16 Claims, 7 Drawing Sheets

(51) Int. Cl.
  *G01J 5/00* (2022.01)
  *G01J 5/04* (2006.01)
  *G01J 5/0875* (2022.01)

(56) References Cited

U.S. PATENT DOCUMENTS

| | | | |
|---|---|---|---|
| 3,539,803 A | 11/1970 | Beerman | |
| 3,641,346 A | 2/1972 | Lachambre | |
| 3,742,231 A | 6/1973 | Spielberger | |
| 3,771,067 A | 11/1973 | Kohl et al. | |
| 4,044,251 A | 8/1977 | Taylor et al. | |
| 4,156,891 A | 5/1979 | Roche | |
| 4,286,311 A | 8/1981 | Maglica | |
| 4,390,291 A | 6/1983 | Gaven, Jr. et al. | |
| 4,437,002 A | 3/1984 | Taniguchi et al. | |
| 4,459,484 A | 7/1984 | Tar | |
| 4,547,673 A * | 10/1985 | Larsen | G08B 17/113 250/573 |
| 4,748,544 A | 5/1988 | Ince | |
| 4,765,749 A | 8/1988 | Bourgade et al. | |
| 4,792,682 A | 12/1988 | Endou et al. | |
| 4,800,278 A | 1/1989 | Taniguti et al. | |
| 4,851,682 A | 7/1989 | Moriyama et al. | |
| 4,868,717 A | 9/1989 | Tyler | |
| 4,900,162 A | 2/1990 | Beckman et al. | |
| 4,956,554 A * | 9/1990 | Baker | G01J 5/34 250/338.3 |
| 4,977,418 A * | 12/1990 | Canty | H04N 23/50 348/E5.025 |
| 5,041,723 A | 8/1991 | Ishida et al. | |
| 5,105,084 A | 4/1992 | Nagai et al. | |
| 5,468,960 A | 11/1995 | Sugimoto et al. | |
| 5,691,536 A | 11/1997 | Shimoyama et al. | |
| 5,721,430 A | 2/1998 | Wong | |
| 5,751,059 A | 5/1998 | Prost | |
| 5,871,279 A * | 2/1999 | Mooradian | G01J 5/049 374/E1.013 |
| 5,914,488 A | 6/1999 | Sone | |
| 5,914,489 A | 6/1999 | Baliga et al. | |
| 5,949,073 A | 9/1999 | Shimoyama | |
| 6,121,621 A | 9/2000 | Warashina et al. | |
| 6,228,290 B1 | 5/2001 | Reames et al. | |
| 6,469,303 B1 | 10/2002 | Sun et al. | |
| 6,548,024 B1 | 4/2003 | Doncaster et al. | |
| 6,700,496 B2 * | 3/2004 | Francke | G08B 17/12 313/539 |
| 6,787,775 B1 * | 9/2004 | Bielefeld | G01J 5/08 250/353 |
| 6,911,648 B2 | 6/2005 | Wu et al. | |
| 7,005,642 B2 | 2/2006 | Nozu | |
| 7,064,403 B2 | 6/2006 | Weiblen et al. | |
| 7,138,926 B2 | 11/2006 | Henry et al. | |
| 7,301,265 B2 | 11/2007 | Fujisawa | |
| 7,387,012 B2 | 6/2008 | Spaolonzi et al. | |
| 7,468,293 B2 | 12/2008 | Weyh et al. | |
| 7,479,635 B2 | 1/2009 | Ichikawa | |
| 7,626,170 B2 | 12/2009 | Harding et al. | |
| 7,851,903 B2 | 12/2010 | Ichikawa | |
| 7,919,751 B2 | 4/2011 | Hayashi et al. | |
| 7,950,820 B2 | 5/2011 | Spartano et al. | |
| 8,366,290 B2 | 2/2013 | Maglica | |
| 8,366,317 B2 | 2/2013 | Ernst et al. | |
| 8,400,314 B2 | 3/2013 | Dittmer et al. | |
| 8,695,402 B2 | 4/2014 | Thorson | |
| 8,753,008 B2 | 6/2014 | Carlson et al. | |
| 8,785,853 B2 | 7/2014 | Yamazaki et al. | |
| 8,792,658 B2 | 7/2014 | Baliga et al. | |
| 8,870,452 B2 | 10/2014 | Yuan | |
| 9,182,362 B2 * | 11/2015 | Kantonen | H01J 35/18 |
| 9,285,251 B2 | 3/2016 | Enquist et al. | |
| 9,719,658 B2 | 8/2017 | Maglica et al. | |
| 9,759,587 B2 | 9/2017 | Hiron-Jones et al. | |
| 9,772,248 B2 | 9/2017 | Gardner et al. | |
| 9,841,302 B2 | 12/2017 | Landis | |
| 10,109,435 B1 | 10/2018 | Wood et al. | |
| 10,180,360 B1 | 1/2019 | Naranjo et al. | |
| 10,182,195 B2 * | 1/2019 | Kostrzewa | H04N 23/57 |
| 10,237,710 B2 | 3/2019 | Manahan et al. | |
| 10,503,332 B2 | 12/2019 | Nicholas et al. | |
| 10,609,262 B2 * | 3/2020 | Kim | G02B 7/028 |
| 10,753,805 B2 | 8/2020 | Slater et al. | |
| 10,794,768 B2 | 10/2020 | Simon et al. | |
| 10,845,047 B2 | 11/2020 | Biermann et al. | |
| 2001/0021607 A1 | 9/2001 | Schmid et al. | |
| 2002/0089283 A1 | 7/2002 | Francke et al. | |
| 2005/0139003 A1 | 6/2005 | Cochran | |
| 2005/0179447 A1 | 8/2005 | Groover et al. | |
| 2008/0061237 A1 | 3/2008 | Franz et al. | |
| 2008/0179524 A1 | 7/2008 | Ichikawa | |
| 2008/0196919 A1 | 8/2008 | SteinIch | |
| 2009/0266988 A1 | 10/2009 | Honda et al. | |
| 2010/0084981 A1 | 4/2010 | Spartano et al. | |
| 2010/0262502 A1 | 10/2010 | Adelman et al. | |
| 2011/0168899 A1 | 7/2011 | Cheshire et al. | |
| 2011/0243162 A1 | 10/2011 | Fuji et al. | |
| 2012/0160052 A1 | 6/2012 | Manahan et al. | |
| 2012/0298867 A1 | 11/2012 | Nishikawa et al. | |
| 2012/0324998 A1 | 12/2012 | Fujiwara et al. | |
| 2013/0112896 A1 | 5/2013 | Dubochet et al. | |
| 2013/0145845 A1 | 6/2013 | Enquist et al. | |
| 2013/0160542 A1 | 6/2013 | Buchnakowski et al. | |
| 2015/0053859 A1 | 2/2015 | Saito | |
| 2015/0253857 A1 | 9/2015 | Diederichs et al. | |
| 2015/0277112 A1 | 10/2015 | Koyoma | |
| 2017/0006193 A1 | 1/2017 | Rud et al. | |
| 2017/0006237 A1 | 1/2017 | Rud et al. | |
| 2017/0164494 A1 | 6/2017 | Duivenvoorden et al. | |
| 2017/0215231 A1 | 7/2017 | Doerk et al. | |
| 2018/0191967 A1 | 7/2018 | Kester | |
| 2018/0348021 A1 | 12/2018 | Ziems et al. | |
| 2019/0159007 A1 | 5/2019 | Manahan et al. | |

FOREIGN PATENT DOCUMENTS

| | | | | |
|---|---|---|---|---|
| CN | 101248252 | | 8/2008 | |
| CN | 101680787 A | | 3/2010 | |
| CN | 201724685 U | | 1/2011 | |
| CN | 102333984 | | 1/2012 | |
| CN | 202327889 U | | 7/2012 | |
| CN | 203349076 U | | 12/2013 | |
| CN | 103575404 A | | 2/2014 | |
| CN | 203551113 U | * | 4/2014 | |
| CN | 104061952 A | | 9/2014 | |
| CN | 104950486 | | 9/2015 | |
| CN | 204758574 U | | 11/2015 | |
| CN | 115655478 B | | 1/2023 | |
| DE | 21 14 449 | | 9/1972 | |
| DE | 2114449 A1 | * | 9/1972 | |
| DE | 42 40 395 A1 | | 6/1994 | |
| DE | 195 19 817 A1 | | 12/1996 | |
| DE | 196 08 543 A1 | | 9/1997 | |
| DE | 197 09 012 C1 | | 10/1998 | |
| DE | 202006014464 | | 12/2006 | |
| DE | 10 2008 010207 | | 8/2009 | |
| DE | 10 2012 222 017 | | 6/2014 | |
| DE | 102013020894 B3 | * | 4/2015 | G03B 17/55 |
| DE | 102015223362 A1 | * | 6/2017 | G01D 11/26 |
| EP | 2 251 846 A1 | | 11/2010 | |
| ES | 2404092 T3 | | 5/2013 | |
| GB | 1368888 A | * | 10/1974 | H01S 3/02 |
| GB | 2165639 | | 4/1986 | |
| GB | 2244175 A | | 11/1991 | |
| JP | S60151199 A | * | 8/1985 | |
| JP | 62280627 | | 12/1987 | |

(56) References Cited

FOREIGN PATENT DOCUMENTS

| | | | |
|---|---|---|---|
| JP | 01059016 | 3/1989 | |
| JP | 01113624 A | 5/1989 | |
| JP | H04247421 A * | 9/1992 | |
| JP | 07190855 | 7/1995 | |
| JP | 07190855 A | 7/1995 | |
| JP | 10002792 | 1/1998 | |
| JP | 2001320615 | 11/2001 | |
| JP | 2004127952 | 4/2004 | |
| JP | 2008298627 A | 12/2008 | |
| JP | 2009175018 A | 8/2009 | |
| JP | 2011232183 | 11/2011 | |
| JP | 2012119830 | 6/2012 | |
| JP | 2012132764 | 7/2012 | |
| JP | 2013-117439 A | 6/2013 | |
| JP | 2018077072 A * | 5/2018 | ............ H04N 23/55 |
| JP | 6582575 B2 * | 10/2019 | ............ G03B 3/10 |
| SU | 708447 | 1/1980 | |
| WO | WO2007/025803 | 3/2007 | |
| WO | WO2007025083 | 3/2007 | |
| WO | WO-2007025083 A2 * | 3/2007 | ............ G01D 5/28 |

OTHER PUBLICATIONS

International Searching Authority, Written Opinion in German and English translation in International Appln. No. PCT/EP2016/078827, Feb. 16, 2017, 13 pages.

Office Action in Chinese (with English translation), Chinese Application No. 201680068583.9, 21 pages (Jan. 20, 2020).

* cited by examiner

EXPLOSION-PROTECTED HOUSING FOR MEANS FOR TRANSMITTING AND RECEIVING ELECTROMAGNETIC RADIATION

PRIORITY CLAIM AND INCORPORATION BY REFERENCE

This application is continuation of U.S. patent application Ser. No. 15/778,947, filed May 24, 2018, which is a 35 U.S.C. § 371 application of International Application No. PCT/EP2016/078827, filed Nov. 25, 2016, which claims the benefit of German Application No. 10 2015 223 362.6, filed Nov. 25, 2015, each of which is incorporated by reference in its entirety.

TECHNICAL FIELD

The present invention relates to an explosion-protected housing for means for transmitting and/or receiving electromagnetic radiation, having a housing body that is configured to receive such transmission and/or reception means and a window element having a first side that faces the housing interior and an opposite second side that faces away from the housing interior, wherein the window element transmits electromagnetic radiation.

BACKGROUND AND SUMMARY OF THE INVENTION

In measurement engineering, in particular safety engineering, such as e.g. within the scope of detecting hazard characteristics such as toxic gases, combustion gases and electromagnetic radiation, flames and sparks, use is made of electronic detection devices, e.g. fire detectors such as flame detectors, spark detectors, gas detectors, and other devices in surroundings and at locations where there is a risk of an explosion.

Examples of such surroundings and locations where explosive gases or dusts may occur include gristmills, flour silos, chemical installations, fuel depots, mines, refineries, oil platforms, drillships and tankers, spray booths, gas compressor stations, wood-processing plants, paper factories and sewage works.

Electronic detection devices that are usable in regions subject to explosion hazards must meet special safety requirements. These have the goal either of precluding an ignition source that could trigger an explosion under certain circumstances or of preventing an explosion arising in the interior of the sealed volume of the housing device from having an effect on the surroundings.

This goal is achievable in various ways that, in corresponding European and international standards, are referred to as ignition protection types.

Requirements for avoiding an ignition source are provided in exemplary fashion by the standards IEC 60079-11 and EN 60079-11. The ignition protection type to this end is referred to as "intrinsic safety" (Ex-i). This is achieved if the electrical variables of current, voltage and power within the device always lie below a predetermined threshold value. The threshold values have to be selected such that no ignitable source, such as a spark or a hot surface, for example, is produced even in the case of a fault, for example as a result of a short circuit.

If no measures are adopted to meet the requirements of intrinsic safety, it is possible, for example, to form the housing of the device within the "flameproof enclosure" (Ex-d) ignition protection category. This ignition protection type is described in the standards IEC 60079-1 and EN 60079-1.

Devices formed according to the "flameproof enclosure" (Ex-d) ignition protection category have a pressure-resistant housing which ensures that an explosion occurring in the interior of the housing cannot be transmitted to the surroundings, cannot be transmitted to the room or cannot be transmitted to the region of the assembly location of the housing. Expressed differently, this means that the housing must not be damaged when an internal explosion occurs and a transmission of the explosion through the wall or a joint in the housing to the external surroundings of the housing is prevented. A housing formed in this way and meeting these requirements, in particular by way of approvals pursuant to the standards IEC 60079-1 or EN 60079-1, is referred to here and below as a pressure-resistant housing. Consequently, a pressure-resistant housing is a housing that is formed in the flameproof enclosure Ex-d ignition protection type for use in explosive atmospheres for gases.

Connections of housing parts and joints arising for structural reasons must have a flameproof embodiment in order to meet the aforementioned standards. A flameproof through connection and a flameproof joint ensure that an explosion occurring in the interior of the housing cannot be transmitted to the surroundings, cannot be transmitted to the room or cannot be transmitted to the region of the assembly location of the housing.

In the "protection by enclosure", Ex-t, ignition protection type, the protection concept is based on the use of dust-protected housings with the IP 5X type of protection and dust-tight housings with the IP 6X type of protection, together with the surface temperature limitation of the equipment such that the external dust atmosphere cannot ignite. The devices are subject to an IP type of protection examination.

The expression "IP . . . type of protection" in conjunction with the invention means the IP code classification, for example pursuant to DIN EN 60529 (VDE 0470-1):2014-09.

Moreover, the devices have to be subjected to environmental testing, for example pursuant to IEC 60079-0 and IEC 60079-31. The environmental tests contain, inter alia, a heat and cold resistance test in the case of polymer housing parts, a shock and impact test, and a pressure test. Equipment of this ignition protection type must meet the requirements of the standard IEC 60079-31, for example.

The dust-tight housing prevents a combustible dust from entering into the housing and being able to be ignited there. Electrically conductive dust, such as metal dust, for example, is kept away by the dust-tight embodiment of the housing and therefore it cannot lead to dangerous overheating as a result of short circuits or electrical transfer resistances.

A housing formed to satisfy the "protection by enclosure", Ex-t, ignition protection type, in particular by way of approvals pursuant to the standards IEC 60079-31 or EN 60079-31, is referred to here and below as a dust-tight housing. Consequently, a dust-tight housing is a housing formed pursuant to the "protection by enclosure", Ex-t, ignition protection type, for use in explosive atmospheres for dust.

Explosion-protected housings having a window element for means for transmitting and/or receiving electromagnetic radiation are known as a matter of principle.

Thus, DE202006014464 discloses a pressure-resistant housing having a window element, formed as a transparent solid, of an optical assembly for input and/or output coupling of electromagnetic radiation. The transparent solid is held in a pressure-resistant casting compound.

A disadvantage of such housings from the prior art lies in high production costs. Further, a plurality of components is required in the prior art for being able to arrange the window element in a securely attached and pressure-resistant, i.e. flameproof, manner on the housing. Further, replacing the window element or a housing part with a window element is not possible, or only possible with much outlay.

The definitions above, in particular in relation to the terms of flameproof property, dust-tightness and explosion protection also apply to the invention, explained below, and the embodiments according to the invention.

Consequently, the invention was based on the object of improving an explosion-protected housing of the type set forth at the outset to the extent of avoiding the disadvantages specified above to the greatest possible extent. In particular, the underlying object was that of reducing the production costs without compromising the ignition protection type, in particular the embodiment as a pressure-resistant housing, and, additionally, of ensuring a high degree of flexibility in the use of such housings, and particularly within the scope of servicing and maintenance.

According to a first aspect, the invention solves this problem for an explosion-protected housing of the type set forth at the outset by virtue of the housing body having a flanging on the second side of the window element, said flanging pressing the window element in the direction of a seat that is formed in the interior of the housing such that the housing is formed as a pressure-resistant housing and/or as a dust-tight housing. Preferably, the seat is arranged in the interior of the housing body. Further preferably, the seat has an integral embodiment with the housing body. In particular, the seat is formed as a projection of the inner wall of the housing body. This further simplifies the assembly, as it is possible to reduce the number of components.

The flanging for mechanically holding the window element is understood to be a metallic clamping element, produced by mechanical bending, in particular by means of cold forming, of a metal edge provided at the housing body using a suitable tool, e.g. a cylindrical roller or a sphere. An advantage of this method lies in increasing the stability by way of the cold forming of the metal. In the raw state of the housing body prior to flanging, the metal edge is preferably formed as a taper, in particular as a bevel or as an axially protruding ring portion. A further advantage lies in only a small coverage in the edge region of the window element being effectuated on account of the low material use of the flanging, and so a free, uncovered window area AU for the transmission of the electromagnetic radiation is achieved. Further, a small area of attack for contaminants on the window element being present is achieved by the embodiment of the flanging.

The flanging facilitates a cost-efficient production since no further parts or housing parts or other measures are required for ensuring the flameproof connection of the window element to the housing body.

Preferably, the window element transmits electromagnetic radiation in the wavelength range of 0.15 μm to 15.0 μm, particularly preferably of 1 μm to 6 μm.

The transmission for the preferred wavelength range is preferably greater than 80%. In order to be able to ensure a large visual region, the material of the window element has a refractive index that is as small as possible, preferably less than 1.5.

According to a particularly preferred development of the invention, (respectively) one elastic sealing element is arranged between the seat and the first side of the window element and/or between the flanging and the second side of the window element. Here, the housing body, the window element and the sealing element or elements are kept in contact with one another in a dust-tight fashion, and preferably in a watertight and/or airtight fashion, by means of the flanging. Here, watertight is considered to be the IP67 type of protection or better. The connection of the window element with the housing and the joint preferably formed in the process preferably have a flameproof embodiment.

The elastic sealing element or elements facilitate the attenuation or absorption of the energy of impact loading on the window element. The size of the window element, in particular the thickness that predetermines the distance between a first and the second side of the window element, and the type of material of the window element and the elasticity of the sealing element or elements are formed in such a way that the window element resists the effect of an impact energy of 2 J to 7 J (joule). Depending on the area of the window element, the impact energy particularly preferably lies at 2 J or 4 J. By way of example, an impact energy of 2 J is assumed if the area to be protected is smaller than 2500 mm$^2$. The window element must preferably withstand a perpendicularly falling test mass of 1 kg without destruction. This impact test is carried out, for example, within the scope of the IEC 60079-0 standard using a test mass of 1 kg and a steel bearing with a 25 mm diameter as an impact area, with the steel bearing sitting under the test mass and touching the window area at impact.

The tightness is tested in the environmental test, after the impact test, and it must at least meet the IP5x type of protection, for example pursuant to IEC 60529. In a particularly preferred embodiment, the dust-tightness type of protection after the impact loading is IP6x.

According to a further configuration, which is, simultaneously, a preferred embodiment of the first aspect and an independent second aspect of the housing set forth at the outset, the window element has a circumferential area that extends from the first side to the second side and that is fastened to the housing by means of an elastic adhesive, wherein the elastic adhesive is arranged between the first side of the window element and a seat that is formed in the interior of the housing body, and between the circumferential area and an inner wall of the housing body, and the window element and the elastic adhesive seal the housing in a dust-tight fashion, and preferably in a watertight and airtight fashion.

The elasticity of the adhesive facilitates attenuation or absorption of the energy of impact loading on the window element. In respect of a preferred configuration of the window element, in particular in respect of the size, the thickness that predetermines the distance between a first and second side of the window element, and the type of material of the window element and the elasticity of the adhesive, reference is made to the explanations made above in respect to the first aspect. The elastic adhesive contributes to the connection of the window element to the housing body having a flameproof embodiment. This is a very simple and cost-effective solution for producing such housings.

Preferably, the housing is formed as a pressure-resistant housing and/or as a dust-tight housing. The housing is preferably formed in the flameproof enclosure Ex "d" ignition protection type for use in gas Ex regions and/or in the protection by enclosure Ex "t" ignition protection type for use in dust Ex regions.

Preferably, the elastic adhesive is a silicone-containing elastomer. This harbors the advantage of being highly elastic over a large temperature range and of being resistant against a multiplicity of chemicals.

The explanations made above in respect of the dust-tight and watertight and/or airtight closure also apply to this second aspect of the invention.

Preferably, the housing body has an inner wall in the region of the window element. A joint is formed in flameproof fashion between the window element and the inner wall. Consequently, it is designed in such a way that it prevents the propagation of a flame from an explosion in the interior to the outside via the housing wall.

Preferably, in the case of a housing volume of less than 100 cm3, the joint has a joint length of at least 6 mm and a gap width of 0.1 mm or less.

In a preferred configuration, the window element has a cylindrical circumferential area. The housing body has a correspondingly formed recess for receiving the window element. The embodiment of the window element as a cylindrical pane and of the recess as a circular receptacle can be produced in a particularly cost-effective manner. Additionally, this form facilitates a uniform acceptance cone or acceptance angle of the means for receiving electromagnetic radiation.

According to a further configuration, the housing body has a first housing part and a second housing part, wherein the first housing part comprises the window element and the second housing part is formed to receive the transmission and/or reception means.

Here, it is preferable for the first housing part to be reversibly detachably connected to the second housing part by means of a flameproof connection, wherein, preferably, the flameproof connection has a first connecting element, preferably a female or male thread, at the first housing part and a corresponding second connection element, preferably a male or female thread, at the second housing part.

In a further particularly preferred embodiment, the first housing part with the window element is formed as an interchange optics. Consequently, a quick interchange by servicing staff is possible in the case of dirtying or wear of the window element, particularly of the second side, which faces the surroundings of the housing, while the embodiment of the housing as a pressure-resistant housing and/or dust-tight housing is maintained.

Here, reversible detachability is understood to mean, in particular, that it is possible in a non-destructive manner to bring about a multiplicity of separations and renewed connections of the connection means.

Particularly for the embodiments having a first and a second housing part, it is advantageous if these have an edge-free, preferably cylindrical, outer face, which acts as a specialist tool working area. This embodiment is preferred as this provides protection against unauthorized opening by means of generally obtainable polygonal tools (e.g. square, hex tools, etc.). For the purposes of releasing and fastening the connection, use is preferably made of a specialist tool for inserting cylindrical pipe and threaded bodies, also referred to as a super socket, or similar tools.

According to further preferred configuration, the reception means for electromagnetic radiation comprise a sensor unit and a sensor signal evaluation unit. Here, a unit that both receives electromagnetic radiation and transmits electromagnetic radiation is understood to be a sensor unit. Preferably, the sensor unit and the sensor signal evaluation unit are configured here to detect electromagnetic radiation in the wavelength range of 0.15 µm to 15 µm. Sparks and flames emit characteristic electromagnetic radiation in the wavelength range of 0.15 µm to 15 µm.

In a further preferred configuration, the body of the first housing part and/or of the second housing part consists of one of the following materials: metal, preferably stainless steel, ceramic, polymer, fiber-reinforced polymer, preferably CFRP or GFRP, or of a combination of a plurality of these materials.

Preferably, the housing according to the invention, the housing body or the first housing part and/or the second housing part are formed as a turned part made of stainless steel. Here, the first cylindrical housing part made of stainless steel is formed as a frame for the window element, which has the form of a cylindrical pane.

Preferably, the housing according to the invention has a free internal volume of at most 100 cm3, particularly preferably of at most 10 cm3 for a compact structure. In order to reduce the free housing volume, the housing preferably is cast in part or in full. As result of this, environmental influences such as humidity, aggressive gas atmospheres, etc., are kept away from the installed parts in the housing interior and the volume of a combustible gas atmosphere is reduced.

The first housing part preferably has an inner wall in the region of the window element and a joint formed in a flameproof manner is formed between the window element and the inner wall. Consequently, said joint is configured in such a way that it prevents the propagation of an explosion from the housing interior to the outside via the housing wall. The joint preferably has a cylindrical embodiment.

To this end, the cylindrical joint has such an embodiment that, preferably, it has a minimum length of 6 mm and a maximum gap width of 0.1 mm.

In a preferred configuration, the window element transmits electromagnetic radiation in the wavelength range from 0.15 µm to 15 µm or in the preferred range of 1 µm to 6 µm. Preferably, the window element is formed from sapphire, forming polymer, borosilicate glass, in particular borosilicate crown glass with a refractive index of 7, stained glass, silicon, or quartz glass, or a combination of a plurality of these materials.

In a further preferred configuration, the housing body has a cylindrical cross section with a cross-sectional area A in the region of the window element, and a window area AU that is not covered by the flanging of the window element and that is 80% or more of the cross-sectional area A. This facilitates a maximum entrance area for the electromagnetic radiation to be input coupled into, and/or output coupled from, the housing, and hence a maximum acceptance angle for the sensor unit. A further advantage of this solution is that the material consumption for the window element is minimized in comparison with solutions where the window element is covered to a greater extent by the securing parts.

The sensor unit is arranged in the reception plane that is spaced apart from the second side of the window element by H. The diameter of the area AU and the distance H determine the size of the acceptance angle $\alpha$, which, at a given distance H, increases with increasing area AU. Here, it is advantageous if the interior of the housing body and the components thereof are formed in the interior in such a way that the electromagnetic radiation arrives at the reception plane with the area AU in unimpeded fashion after it passes through the first side of the window element. According to a preferred embodiment, the acceptance angle is greater than 90 degrees, preferably 120 or 140 degrees.

The signal/energy supply into the pressure-resistant housing is preferably formed by means of a cable entry that is inserted into the housing body with a flameproof thread or by means of a suitable bore through a wall of the housing body that is preferably sealed in a pressure-resistant manner by way of casting in the interior.

The invention is reflected not only in the explosion-protected housing with its individual elements, but also in the modular combination of these individual elements.

Consequently, in a third aspect, the invention relates to an explosion-protected housing kit having an explosion-protected housing according to any one of the preferred embodiments described above, having the first housing part and the second housing part, wherein the first housing part preferably comprises the window element and the second housing part is formed for receiving the transmission and/or reception means, and further having one or more further first housing parts, which are kept available as interchange optics and which preferably each have window elements with different embodiments from the others, and/or one or more further second housing parts which each have transmission and/or reception means, preferably with different embodiments from the others, for electromagnetic radiation and which are kept available as interchange transmission units and/or interchange reception units.

The preferred embodiments according to the first and third aspect are preferred embodiments of the second aspect at the same time. The preferred embodiments of the first and second aspect are preferred embodiments of the third aspect at the same time. The preferred embodiments of the second and third aspect of the invention are preferred embodiments of the first aspect of the invention at the same time.

The third aspect of the invention and all configuration variations with the configuration of the housing body with the first housing part and the second housing part are advantageous in that a modular platform concept is provided, by means of which it is possible to combine various first housing parts, which differ in terms of the transmissivity and/or the mechanical properties of the window element, in particular in respect of the passed wavelength, with second housing parts that in each case have different transmission and/or reception means for electromagnetic radiation that are adapted to the measuring or monitoring task. Furthermore, the flexibility and the simplicity of the interchange of these housing parts improve the retrofitting efficiency for the servicing staff and facilitate a quick assembly of the housings directly at the assembly location. Consequently, it is possible to use structurally identical explosion-protected housings with structurally identical housing parts for different applications, significantly reducing the production costs.

As a particular advantage of that embodiment in which the first housing part with the window element is formed as interchange optics, it is possible to very flexibly and cost-effectively replace the interchange optics in the case of dirtying or wear of the window element, without compromising on the dust-protection function or pressure-resistance of the housing. By way of example, a preferred use lies in monitoring a powdery or particulate material flow, in which the interchange optics, in particular, are subjected to particular load and exposed to contaminants.

In a fourth aspect, the invention relates to a method for producing an explosion-protected housing or part of a housing for means for transmitting and/or receiving electromagnetic radiation.

The invention solves the problem described at the outset by virtue of the method including the following steps:

producing or providing a housing body that has a longitudinal axis, a housing interior for receiving such transmission and/or reception means, a seat, formed in the interior of the housing body, for a window element and a metallic edge which protrudes from the housing body in the direction of the longitudinal axis and which is formed, in particular, as a bevel or ring-shaped projection, producing or providing a window element, inserting the window element into the interior of the housing body at the side of the seat, and flanging the metallic edge in such a way that the flanged edge presses the window element against the seat.

The method according to the invention is advantageously developed by virtue of a sealing element, preferably an elastic sealing element, being inserted at the side of the seat prior to the insertion of the window element into the interior of the housing body, wherein the sealing element is brought into sealing abutment with the seat on the one hand and the window element on the other hand by means of the flanging.

The housing or the housing body is preferably formed according to one of the preferred embodiments, described herein, of the first or second aspect and it is preferably provided for use in a kit according to the third aspect of the invention.

BRIEF DESCRIPTION OF THE DRAWINGS

The invention will be described in more detail below on the basis of a plurality of preferred exemplary embodiments, with reference being made to the attached figures. Here.

MODE(S) FOR CARRYING OUT THE INVENTION

Figure 1:
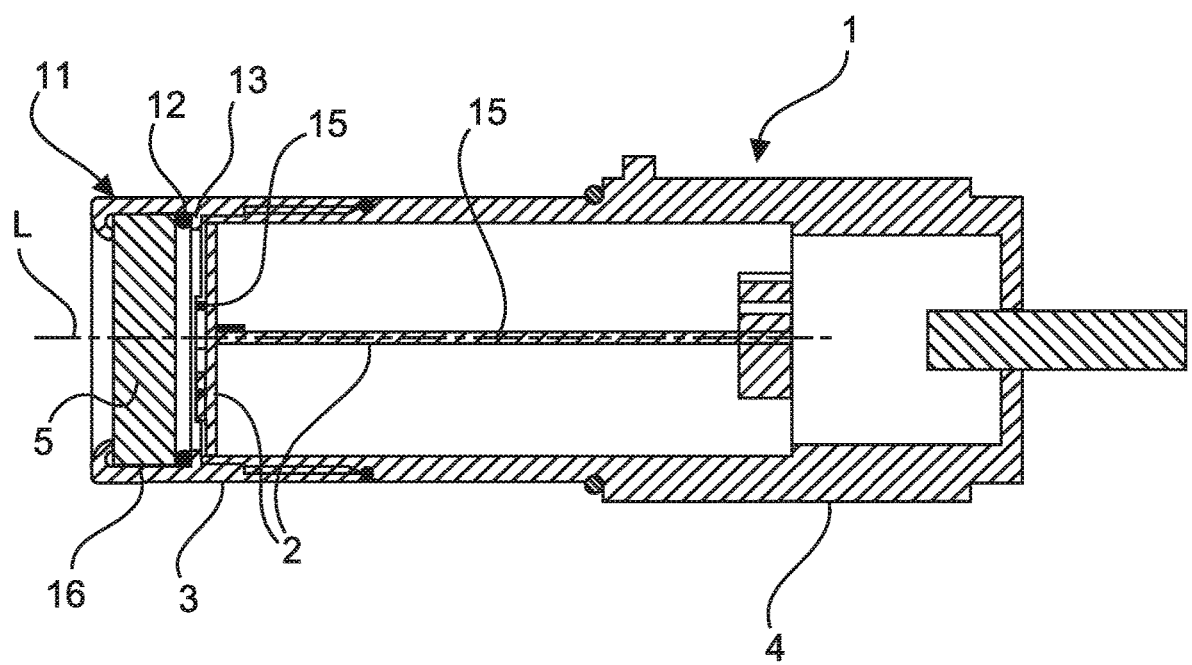
FIG. 1 shows a schematic illustration of an explosion-protected housing of a preferred embodiment.

FIG. 1 shows an explosion-protected housing according to a first preferred exemplary embodiment of the invention. The explosion-protected housing has a housing body 1, which is configured to receive means for transmitting and/or receiving 2 electromagnetic radiation. Furthermore, the housing has a window element 5. The window element 5 has two sides: a first side 7 facing the housing interior and an opposite second side 6 facing away from the housing interior (see FIG. 2). In this exemplary embodiment, the window element 5 transmits electromagnetic radiation, preferably in the wavelength range of 1 µm to 6 µm.

Figure 2:
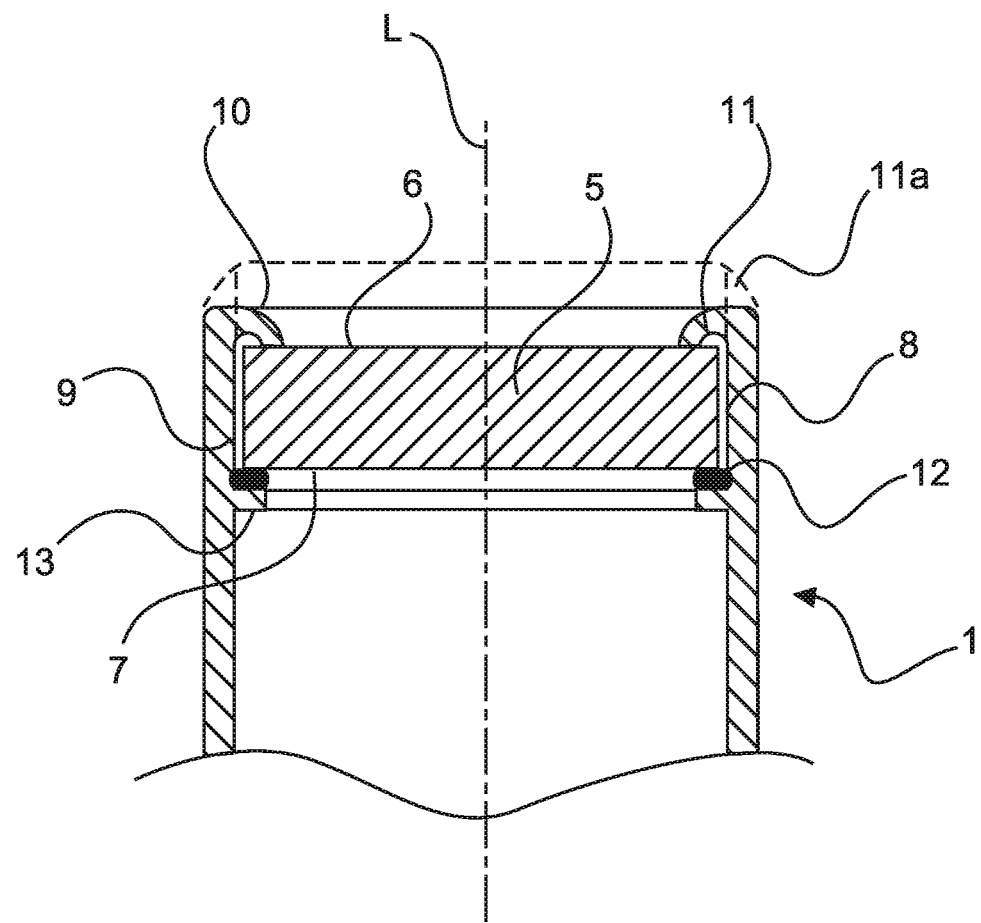
FIG. 2 shows a magnified schematic illustration of a section of the housing body according to FIG. 1 with the arrangement of the window element with a flanging.

A section of the housing body is illustrated in FIG. 2. On the second side 6 of the window element 5, the housing body 1 has a flanging 11 which is bent inward toward the window element 5 and which presses the window element 5 in the direction of a seat 13 formed in the interior of the housing such that the housing, as illustrated in FIG. 1, is formed as a pressure-resistant housing and/or as a dust-tight housing. The flanging 11 was preferably produced in the method according to the invention from a metallic edge 11a (indicated by dashed lines in FIG. 2) that protrudes in the direction of a longitudinal axis L. By way of example, the edge 11a was present as a taper, as a bevel or as a ring-shaped projection. Preferably, the edge 11a is bent in the direction of the window element 5 in a forming method by means of a flanging tool. Particularly preferably, the edge 11a is bent by means of cold forming.

In this embodiment, the seat 13 is preferably arranged as a circumferential support web in the interior of the housing body 1. Furthermore, FIG. 2 shows the configuration of the housing with the arrangement of an elastic sealing element 12 between the seat 13 and the first side 7 of the window element 5. The additional or exclusive arrangement of the elastic sealing element 12 between the flanging 11 and the second side 6 of the window element 5 for further advantageous embodiments is not illustrated. Here, the flanging 11 is used to keep the housing body 1, the window element 5 and the sealing element 12 in contact with one another in a dust-tight and preferably watertight and airtight fashion.

Figure 3:
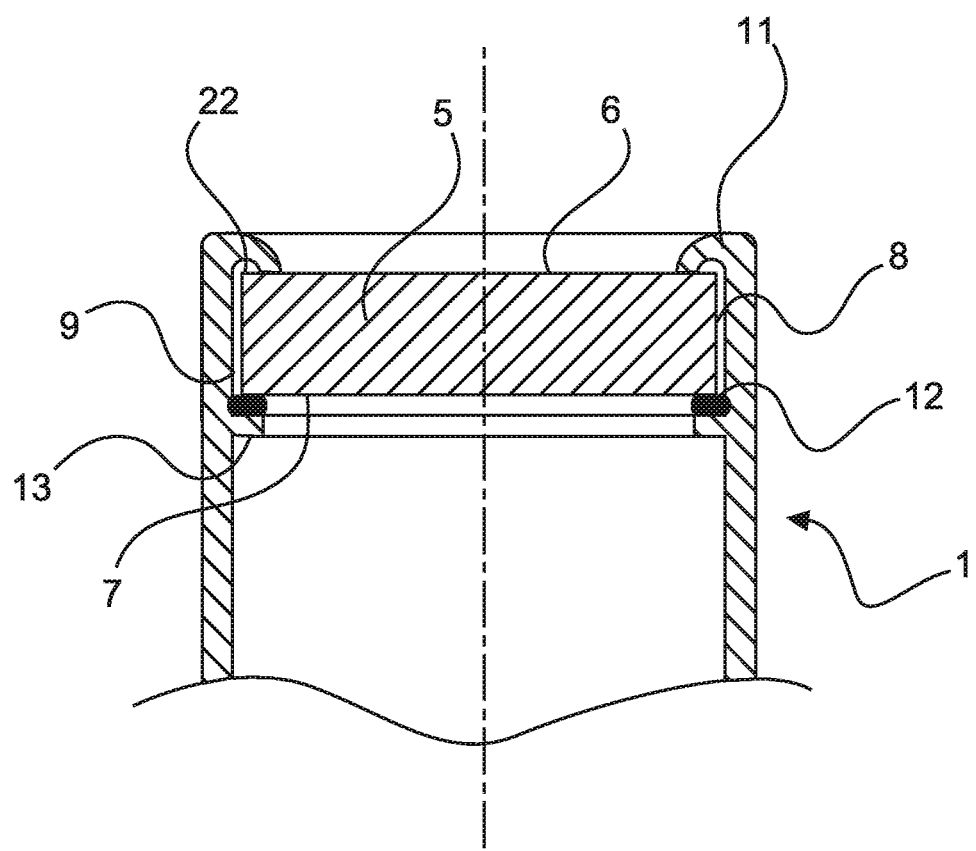
FIG. 3 shows a schematic illustration of a section of the housing body with the arrangement of the window element according to FIGS. 1 and 2 with an elastic adhesive.

FIG. 3 illustrates a section of the explosion-protected housing according to the second aspect of the invention. The window element 5 has a circumferential area 8 that extends from the first side 7 to the second side 6 of the window element 5 and that is fastened to the housing by means of an elastic adhesive 22. The elastic adhesive 22 is arranged between the first side 7 of the window element 5 and a seat 13 formed in the interior of the housing body 1 and between the circumferential area 8 and an inner housing wall of the housing body 1. The window element 5 and the elastic adhesive 22 seal the housing in a dust-tight and preferably watertight and airtight fashion.

In particular, the housing according to FIG. 1 is formed as a pressure-resistant housing and/or as a dust-tight housing. To this end, a joint 9, as in FIG. 2, which is formed between an inside wall or inner wall 10 of the housing body 1 in the region of the window element 5 and the window element 5, has a flameproof embodiment. Preferably, the housing according to the invention has a free internal volume of 35 to 45 cm3. The joint 9 preferably has a minimum length of 6 mm and a maximum gap width of 0.1 mm. The window element 5 is formed as a cylindrical pane and it has a cylindrical circumferential area, and the housing body 1 correspondingly has a correspondingly formed cylindrically formed recess for receiving the window element 5.

As illustrated in FIG. 1, the housing body 1 preferably has a two-part embodiment. The housing body 1 has a first housing part 3 and a second housing part 4, which are preferably formed from stainless steel. The window element 5 is arranged in the first housing part 3. The second housing part 4 is formed to receive the transmission and/or reception means 2 for electromagnetic radiation, with these preferably comprising a sensor unit 14 and a sensor signal evaluation unit 15.

Figure 6A:
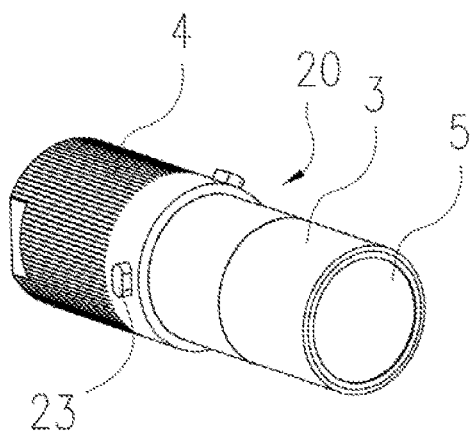
FIGS. 6a to 6c show a schematic overview illustration of an explosion-protected housing kit.

As illustrated in FIG. 1 and FIG. 6a, the first housing part 3 is reversibly detachably connected to the second housing part 4, preferably by means of a flameproof connection 20 (FIG. 6a). The two housing parts 3, 4 are illustrated in a mutually separated state in FIGS. 6b and 6c.

Figure 4:
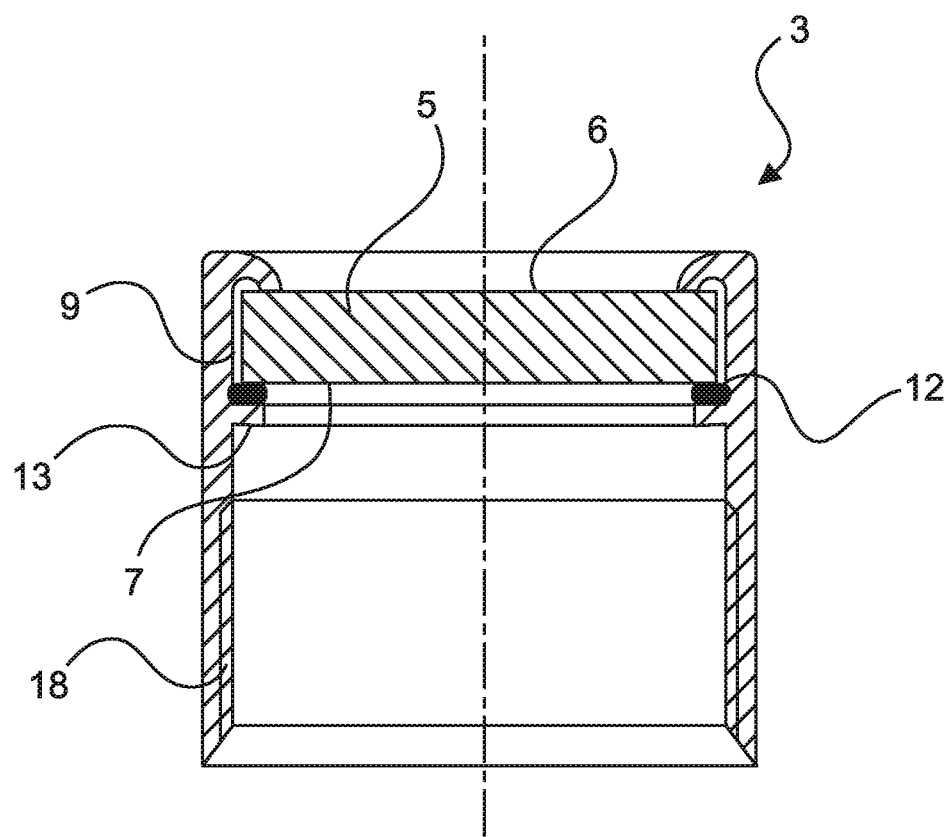
FIG. 4 shows a schematic illustration of a first housing part for a two-part embodiment of the housing body.
Figure 6B:
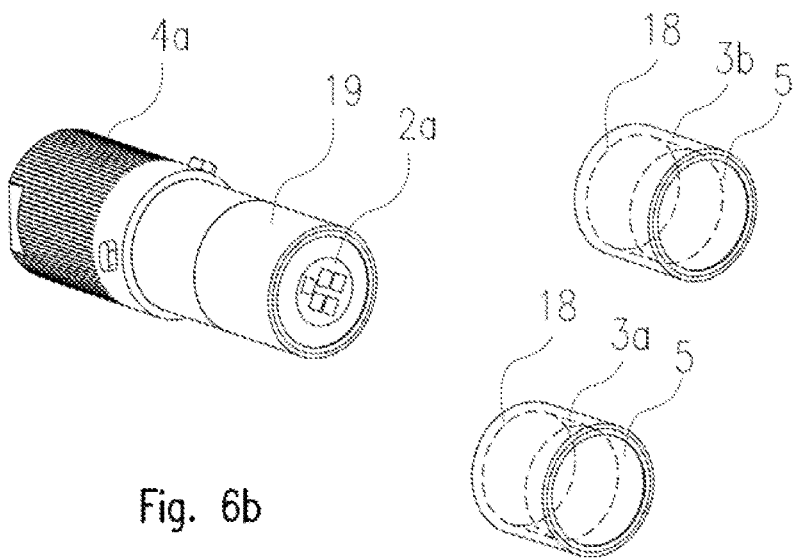

The flameproof joint 20 is formed by a first connecting element 18, formed as a female thread at the first housing part 3 in FIG. 4 and FIG. 6b, and as a corresponding second connecting element 19, in this case a male thread at the second housing part 4. The first housing part 3 and the second housing part 4 have an edge-free, cylindrical outer face. For the purposes of opening the housing, this requires a specialist tool.

Figure 5:
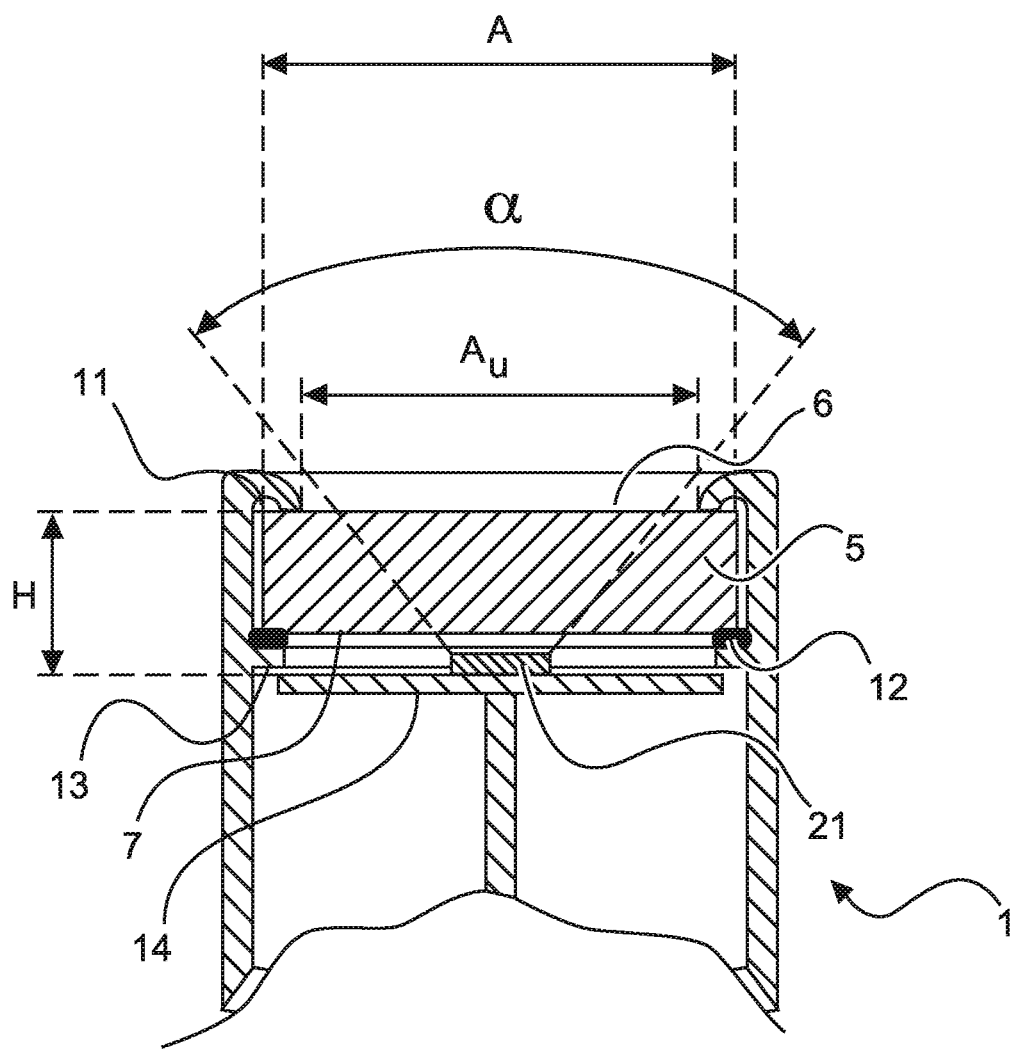
FIG. 5 shows a schematic illustration of the uncovered window area AU.

FIG. 5 illustrates a further preferred embodiment. In the region of the window element 5, the housing body 1 has a cylindrical cross section with a cross-sectional area A. The window area AU that remains uncovered by the flanging 11 of the window element 5 is selected in such a way that it is 80% or more of the cross-sectional area A. Consequently, a large acceptance angle α of preferably more than 90 degrees is realized and a compact structure is facilitated. The sensor unit 14 with the sensor element 21 is arranged in the reception plane that is spaced apart from the second side 6 of the window element 5 by H.

In the embodiment according to FIG. 5, the sensor unit 14 and the sensor signal evaluation unit 15 (not illustrated) are configured to detect sparks and/or flames. To this end, the sensor unit 14 is configured to detect electromagnetic radiation in the range of 0.15 μm to 15 μm.

Preferably, the window element 5 correspondingly transmits electromagnetic radiation in the wavelength range of 1 μm to 6 μm and preferably consists of sapphire.

Figure 6C:
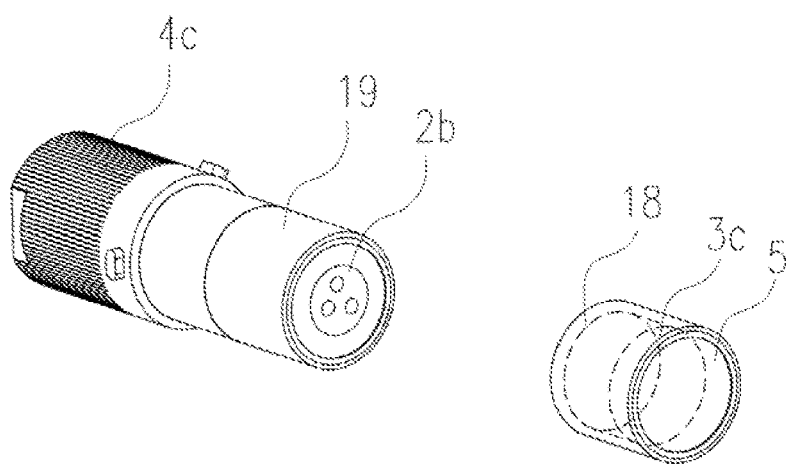

FIGS. 6 (6a to 6c) schematically illustrates the third aspect of the invention, an explosion-protected housing kit. In this embodiment, it comprises one or more explosion-protected housings that have a two-part embodiment of the housing body 1 with a first housing part 3 and a second housing part of 4, which are reversibly detachably connected to one another by means of the flameproof connection 20 (see FIG. 1 and FIG. 6a). Further, the housing kit comprises a plurality of first housing parts 3, which are formed as interchange optics and which are kept available in this modular concept. In FIGS. 6a to 6c, three housing parts 3a, 3b and 3c thereof are illustrated in an exemplary manner. The first housing parts 3a and 3b have a structurally identical window element 5 with the same transmission properties for electromagnetic radiation. In the case of dirtying or wear, the interchange optics 3a can be replaced by the interchange optics 3b since the flameproof connection 20 is reversibly detachable. Consequently, it is possible to change the interchange optics in a quick and flexible manner, while the embodiment of the housing as a pressure-resistant housing and/or dust-tight housing is maintained.

Preferably, housing parts 3c that each have window elements with different embodiments from the other housing parts are kept available as interchange optics. The explosion-protected housing kit further preferably comprises a plurality of second housing parts 4, with only 4a and 4c being illustrated in the illustrated embodiment (see FIGS. 6a to 6c). These preferably have transmission and/or reception means 2, with different embodiments from the other housing parts 4, for electromagnetic radiation, in this case preferably 2a (see FIGS. 6b) and 2b (see FIG. 6c). These housing parts 4, 4a, 4c, too, can be replaced when necessary by means of the reversibly detachable flameproof connection 20 (see FIG. 1 and FIG. 6a) or, contingent on the measurement problem, they can be combined with the associated first housing parts 3, 3a, 3c already during the installation. The housing parts 4, e.g. 4a and 4c, are kept available as interchange transmission units and/or interchange reception units in this modular concept.

Figure 7:
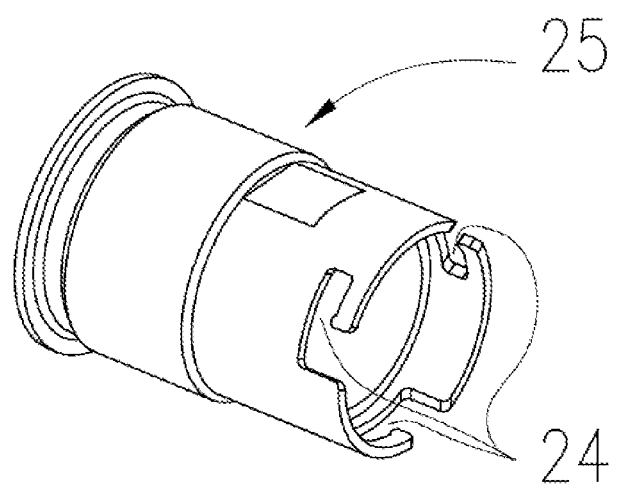
FIG. 7 shows a schematic illustration of a receptacle for the housing.

FIG. 6a illustrates a further preferred embodiment of the housing. A number of projections 23 are formed on the housing body 1, in particular on the second housing part 4 of the housing body 1. In the shown exemplary embodiment, a total of three projections 23 are distributed uniformly over the circumference of the housing body 1 or of the second housing part 4. The projections 23 are formed for engagement in corresponding slotted guides 24 of a bayonet closure. With the aid of the projections 23, it is possible to efficiently securely install the housing in a receptacle 25 provided therefor, as shown in FIG. 7, where the receptacle 25 has the slotted guides 24 for the projections 23. Alternatively, the number of projections 23 are formed on the first housing part 3 (not illustrated here) in other preferred embodiments. Likewise, an integral housing body 1 can have a corresponding number of projections 23 on the circumferential area thereof. In a preferred embodiment, the receptacle 25 is fastened to the object to be protected and aligned on the region to be protected in such a way that, after insertion of the housing body 1 in the receptacle 25, the acceptance angle α captures the region to be protected.

As emerges from the explanations made above, the present invention has presented an explosion-protected housing for means for transmitting and/or receiving electromagnetic radiation, and a housing kit. The simplicity of the flameproof connection of the window element to the housing and the standardization of the first and second housing parts, which are formed for flexible combinations and for quick and flexible replacements during maintenance and servicing work, facilitate a reduction in costs during the production of the components and significantly reduce the outlay for maintenance and service, without compromising the protective function of the housing.

LIST OF UTILIZED REFERENCE CHARACTERS

1 Housing body
2, 2a, 2b Transmission and/or reception means for electromagnetic radiations
3, 3a, 3b, 3c First housing part, preferably embodied as an interchange optics
4, 4a, 4c Second housing part
5 Window element
6 Second side of the window element (facing away from the housing interior)
7 First side of the window element (facing the housing interior)
8 Circumferential area, preferably cylindrical lateral area of the window element 5
9 Joint
10 Inside wall or inner wall of the housing body 1
11 Flanging
12 Metallic edge
13 Seat
14 Sensor unit
15 Sensor signal evaluation unit
18 First connecting element
19 Second connecting element
20 Flameproof connection of the first housing part (3, 3a, 3b, 3c) to the second housing part (4, 4a, 4c)
21 Sensor element and/or sensor array
22 Elastic adhesive
23 Projections at the housing body
A Cross-sectional area of the housing body 1 in the region of the window element 5
Aμ Free uncovered area of the window element 5
L Longitudinal axis

The invention claimed is:

1. An explosion-protected housing for means for transmitting and/or receiving electromagnetic radiation, comprising:

a housing body configured to receive the means for transmitting and/or receiving electromagnetic radiation; and
a window element having a first side that faces an interior of the housing body and an opposite second side that faces away from the interior of the housing body,
wherein the window element transmits electromagnetic radiation,
wherein the housing body presses the second side of the window element in the direction of a seat formed in the interior of the housing body such that the explosion-protected housing is formed as a pressure-resistant housing and/or as a dust-tight housing, and
wherein the interior of the housing body surrounds a cylindrical circumferential area of the window element to define a cylindrical joint, and
wherein the cylindrical joint defines a gap so that the cylindrical joint prevents propagation of a flame from an explosion in the interior of the housing body to outside the interior of the housing body.

2. The housing as claimed in claim 1, wherein an elastic sealing element is arranged between the seat and the first side of the window element and/or between the interior of the housing body and the second side of the window element.

3. The housing as claimed in claim 2, wherein the interior of the housing body comprises an inner wall in the region of the window element, and wherein the cylindrical joint is formed between the cylindrical circumferential area of the window element and the inner wall.

4. The housing as claimed in claim 3, wherein, to receive the cylindrical circumferential area of the window element, the housing body comprises a correspondingly formed recess.

5. The housing as claimed in claim 1, wherein the housing body comprises a first housing part and a second housing part, wherein the first housing part comprises the window element and the second housing part is configured to receive the means for transmitting and/or receiving electromagnetic radiation.

6. The housing as claimed in claim 5, wherein the first housing part is reversibly detachably connected to the second housing part by a flameproof connection.

7. The housing as claimed in claim 6, wherein the flameproof connection comprises a first connecting element including a female or male thread, at the first housing part and a corresponding second connecting element including a corresponding male or female thread, at the second housing part.

8. The housing as claimed in claim 5, wherein the first housing part and/or the second housing part comprise an edge-free, cylindrical, outer face.

9. The housing as claimed in claim 1, wherein the means for transmitting and/or receiving electromagnetic radiation comprises a sensor unit and a sensor signal evaluation unit.

10. The housing as claimed in claim 9, wherein the sensor unit and sensor signal evaluation unit are configured to detect electromagnetic radiation in a wavelength range of 0.15 μm to 15 μm.

11. The housing as claimed in claim 5, wherein the first housing part and/or the second housing part consists of one of the following materials: metal, stainless steel, ceramic, polymer, fiber-reinforced polymer, or a combination of a plurality of these materials.

12. The housing as claimed in claim 10, wherein the window element transmits the electromagnetic radiation in the wavelength range of 0.15 μm to 15 μm and is formed from one of the following materials: sapphire, polymer, borosilicate glass, stained glass, silicon, or quartz glass, or a combination of a plurality of these materials.

13. The housing as claimed in claim 1, wherein the housing body comprises a cylindrical cross section with a cross-sectional area in the region of the window element, and a window area that is not covered by the housing body is 80% or more of the cross-sectional area.

14. An explosion-protected housing kit, having comprising:
- a housing as claimed in claim 5,
- one or more further first housing parts, which are kept available as interchange optics and which each have window elements that are distinct from the others, respectively, and/or
- one or more further second housing parts which each comprise means for transmitting and/or receiving electromagnetic radiation that are distinct from the others, and which are kept available as interchange units of the means for transmitting and/or receiving electromagnetic radiation.

15. A method for producing an explosion-protected housing or part of a housing for means for transmitting and/or receiving electromagnetic radiation comprising:
- providing a housing body that has a longitudinal axis, a housing interior for receiving the means for transmitting and/or receiving electromagnetic radiation, and a seat formed in the housing interior of the housing body,
- inserting a window element into the housing interior of the housing body at a side of the seat,
- pressing the window element against the seat, and
- forming a cylindrical joint between the housing interior and a cylindrical circumferential area of the window element that prevents propagation of a flame from an explosion in the housing interior to outside the housing interior.

16. The method as claimed in claim 15, further comprising:
- inserting an elastic sealing element at the side of the seat prior to the inserting the window element into the interior of the housing body, and
- forming a sealing abutment of the elastic sealing element with the seat and the window element.

* * * * *